(12) United States Patent
Thomas et al.

(10) Patent No.: US 11,790,391 B1
(45) Date of Patent: Oct. 17, 2023

(54) SYSTEMS AND METHODS TO RECOMMEND BENEFIT TYPES OF BENEFIT ITEMS TO OFFER WITHIN A MEMBERSHIP PLATFORM

(71) Applicant: Patreon, Inc., San Francisco, CA (US)

(72) Inventors: Darby Thomas, San Francisco, CA (US); Jennifer Pugh, Oakland, CA (US); Jenna Lee, San Francisco, CA (US); Nicholas Swanson, Oakland, CA (US); Claudia Gold, Boca Raton, FL (US); Elana Koren, San Francisco, CA (US)

(73) Assignee: PATREON, INC., San Francisco, CA (US)

( * ) Notice: Subject to any disclaimer, the term of this patent is extended or adjusted under 35 U.S.C. 154(b) by 464 days.

(21) Appl. No.: 16/821,393

(22) Filed: Mar. 17, 2020

(51) Int. Cl.
*G06Q 30/00* (2023.01)
*H04L 29/08* (2006.01)
*G06N 20/00* (2019.01)
*G06Q 30/0207* (2023.01)
*H04L 67/306* (2022.01)
*G06Q 30/0226* (2023.01)

(52) U.S. Cl.
CPC ........... *G06Q 30/0236* (2013.01); *G06N 20/00* (2019.01); *G06Q 30/0226* (2013.01); *H04L 67/306* (2013.01)

(58) Field of Classification Search
None
See application file for complete search history.

(56) References Cited

U.S. PATENT DOCUMENTS

| 7,921,028 | B2* | 4/2011 | Cole | G06Q 30/06 705/7.29 |
| 8,051,040 | B2 | 11/2011 | Johnson et al. | |
| 8,375,024 | B2 | 2/2013 | Goeldi | |
| 8,850,490 | B1* | 9/2014 | Thomas et al. | H04N 21/47211 725/50 |
| 9,060,249 | B2 | 6/2015 | Meredith et al. | |

(Continued)

FOREIGN PATENT DOCUMENTS

| JP | 2019191623 A | 10/2019 |
| WO | 2009045899 A2 | 4/2009 |

OTHER PUBLICATIONS

Author(s):Osuala Title: Impact of subscription based crowdfunding on creators online channels Journal: ERF [online]. Publication date: 2019.[retrieved on: Feb. 23, 2023 ]. Retrieved from the Internet: <URL: https://aisel.aisnet.org/cgi/viewcontent.cgi?article=1017&context=amcis2019> (Year: 2019).

(Continued)

*Primary Examiner* — Luis A Brown
(74) *Attorney, Agent, or Firm* — ESPLIN & ASSOCIATES, PC

(57) ABSTRACT

Systems and methods are provided for recommending benefit types of benefit items to offer within a membership platform. Exemplary implementations may: obtain benefit information for content creators of a membership platform; obtain creator profile information for content creators of a membership platform, the creator profile information including individual creator types of individual content creators; obtain benefit information for the content creators, the benefit information including descriptions of benefit items offered by the content creators to subscribers of the membership platform in exchange for consideration, the benefit items being characterized by benefit types; generate, based on the creator profile information and the benefit information, recommendations for the benefit types of the benefit items the content creators of a given creator type should offer; effectuate presentation of the recommendations on a user interface displayed on computing platforms of the content creators; and/or perform other operations.

19 Claims, 5 Drawing Sheets

(56) References Cited

U.S. PATENT DOCUMENTS

| | | | |
|---|---|---|---|
| 9,558,277 B2 | 1/2017 | Pappas | |
| 9,734,521 B2 | 8/2017 | Curtis et al. | |
| 9,767,208 B1 | 9/2017 | Chow et al. | |
| 9,870,581 B1 | 1/2018 | Vormweg | |
| 10,356,574 B1 | 7/2019 | Wood | |
| 10,607,242 B1* | 3/2020 | Wood et al. | G06Q 30/0201 |
| 10,621,532 B1* | 4/2020 | Conte et al. | G06Q 10/0637 |
| 10,936,986 B2 | 3/2021 | Conte et al. | |
| 10,937,042 B2 | 3/2021 | Wood et al. | |
| 11,049,191 B1 | 6/2021 | Wilczek et al. | |
| 11,270,330 B1* | 3/2022 | Brini et al. | G06Q 40/10 |
| 2002/0036654 A1* | 3/2002 | Evans et al. | G06Q 30/0257 715/744 |
| 2002/0103698 A1* | 8/2002 | Cantrell | G06Q 30/02 705/14.55 |
| 2007/0038516 A1* | 2/2007 | Apple et al. | G06Q 30/02 705/14.42 |
| 2007/0069013 A1 | 3/2007 | Seifert et al. | |
| 2007/0164554 A1 | 7/2007 | Krone et al. | |
| 2008/0120185 A1* | 5/2008 | Evans | G06Q 30/02 705/14.69 |
| 2008/0183577 A1* | 7/2008 | Evans | G06Q 30/0273 705/14.69 |
| 2008/0215467 A1 | 9/2008 | Huffman et al. | |
| 2008/0265020 A1 | 10/2008 | Copeland et al. | |
| 2009/0158318 A1 | 6/2009 | Levy | |
| 2009/0234710 A1* | 9/2009 | Belgaied Hassine et al. | G06Q 30/0201 705/7.29 |
| 2011/0258049 A1 | 10/2011 | Ramer et al. | |
| 2011/0295722 A1* | 12/2011 | Reisman | G06Q 30/0641 705/26.1 |
| 2012/0179556 A1 | 7/2012 | Ertas | |
| 2012/0272278 A1 | 10/2012 | Bedi | |
| 2012/0278725 A1 | 11/2012 | Gordon et al. | |
| 2012/0311462 A1 | 12/2012 | Devecka | |
| 2013/0197979 A1* | 8/2013 | Han et al. | G06Q 30/0207 705/14.1 |
| 2013/0226691 A1* | 8/2013 | Chatow et al. | G06Q 30/02 705/14.42 |
| 2013/0275429 A1 | 10/2013 | York et al. | |
| 2014/0025473 A1 | 1/2014 | Cohen | |
| 2014/0032326 A1* | 1/2014 | Li et al. | G06Q 30/0266 705/14.58 |
| 2014/0067554 A1 | 3/2014 | Heppding | |
| 2014/0067702 A1 | 3/2014 | Rathod | |
| 2014/0122507 A1 | 5/2014 | Zeng et al. | |
| 2014/0164049 A1 | 6/2014 | Yakos et al. | |
| 2014/0164514 A1 | 6/2014 | Eteminan et al. | |
| 2014/0214641 A1 | 7/2014 | Acker, Jr. et al. | |
| 2014/0280121 A1 | 9/2014 | Sharp et al. | |
| 2014/0324604 A1* | 10/2014 | Munoz Torres et al. | G06Q 30/0276 705/14.72 |
| 2014/0366047 A1 | 12/2014 | Thomas et al. | |
| 2015/0066189 A1 | 3/2015 | Mulligan et al. | |
| 2015/0066675 A1 | 3/2015 | Camelio | |
| 2015/0193889 A1 | 7/2015 | Garg et al. | |
| 2015/0363899 A1 | 12/2015 | Krause et al. | |
| 2016/0071058 A1 | 3/2016 | Galuten | |
| 2016/0080485 A1 | 3/2016 | Hamedi | |
| 2016/0124918 A1 | 5/2016 | Ying | |
| 2016/0189198 A1* | 6/2016 | McKenzie et al. | G06Q 30/0277 705/14.41 |
| 2016/0210650 A1 | 7/2016 | Sewell et al. | |
| 2016/0232480 A1 | 8/2016 | Erez et al. | |
| 2016/0357376 A1 | 12/2016 | Carrigan et al. | |
| 2017/0076348 A1 | 3/2017 | Jennings et al. | |
| 2017/0083930 A1 | 3/2017 | Nagaraj et al. | |
| 2017/0161794 A1* | 6/2017 | Zhu et al. | G06Q 30/0276 |
| 2017/0337621 A1 | 11/2017 | Peters | |
| 2018/0040019 A1 | 2/2018 | Gavlovski et al. | |
| 2018/0075147 A1 | 3/2018 | Bagheri et al. | |
| 2018/0121973 A1 | 5/2018 | DiMascio et al. | |
| 2018/0144052 A1 | 5/2018 | Sayyadi-Harikandehei et al. | |
| 2018/0365709 A1 | 12/2018 | Modani et al. | |
| 2019/0026280 A1 | 1/2019 | Aviyam et al. | |
| 2019/0026782 A1 | 1/2019 | McGrath et al. | |
| 2019/0164082 A1 | 5/2019 | Wu | |
| 2019/0290965 A1 | 9/2019 | Oren | |
| 2019/0361577 A1 | 11/2019 | Burns et al. | |
| 2020/0007934 A1 | 1/2020 | Ortiz et al. | |
| 2020/0020014 A1* | 1/2020 | Jin et al. | G06N 5/046 |
| 2020/0089724 A1 | 3/2020 | Zimovnov et al. | |
| 2020/0134696 A1* | 4/2020 | Lardeux et al. | G06Q 30/0254 |
| 2020/0219025 A1* | 7/2020 | Conte et al. | G06Q 30/0204 |
| 2020/0219114 A1* | 7/2020 | Wood et al. | G06Q 30/0202 |
| 2020/0300538 A1 | 9/2020 | Avakian et al. | |
| 2020/0311751 A1 | 10/2020 | Shi et al. | |
| 2020/0320571 A1 | 10/2020 | Singh et al. | |
| 2021/0133651 A1 | 5/2021 | Conte et al. | |
| 2021/0133775 A1* | 5/2021 | Wood et al. | G06Q 30/0201 |
| 2021/0158317 A1 | 5/2021 | Kurylko et al. | |
| 2021/0192460 A1 | 6/2021 | Xu et al. | |
| 2022/0277356 A1 | 9/2022 | Russo et al. | |
| 2022/0318704 A1 | 10/2022 | Brini et al. | |
| 2022/0377399 A1 | 11/2022 | Bonner et al. | |

OTHER PUBLICATIONS

Content and conduit: Relative profitability in the new era of television Todreas, Timothy Michael. ProQuest Dissertations and Theses, ProQuest Dissertations Publishing. (1996) (Year: 1996) 431 pages.

F. Cappa, S. Franco, E. Ferrucci and R. Maiolini, "The Impact of Product and Reward Types in Reward-Based Crowdfunding," Mar. 11, 2021, in IEEE Transactions on Engineering Management, 12 pages, doi: 10.1109/TEM.2021.3058309 (Year: 2021).

Gerri Detweiler, Reward Crowdfunding, Mar. 20, 2020, Nav, 11 pages, https://www.nav.com/business-financing-optionsrewardcrowdfunding/ (Year: 2020).

Harris, William. "26 Inexpensive Customer Delight Ideas Worth Trying to Fuel Business Growth" Sellbrite, Jun. 2016, https:///ww.sellbrite.com/blog/customer-delight/(Year: 2016) 26 pages.

Hyken, Shep. "Seven Ways to Properly Give a Gift to Your Customers" Shep Hyken's Blog, Jun. 2016, https://hyken.com/internalcustomers/seven-ways-properly-give-gift-customers/ (Year: 2016) 11 pages.

J. Lahann, M. Scheid and P. Fettke, "Utilizing Machine Learning Techniques to Reveal VAT Compliance Violations in Accounting Data," 2019 IEEE 21st Conference on Business Informatics (CBI), 2019, pp. 1-10, doi: 10.1109/CBI.2019.00008.

L. Xuefeng and W. Zhao, "Using Crowdfunding in an Innovative Way: A Case Study from a Chinese Crowdfunding Platform," 2018 Portland International Conference on Management of Engineering and Technology (PICMET), 2018, pp. 1-9, doi: 10.23919/PICMET.2018.8481838. (Year: 2018).

Lopez et al., A Recommender System Based on a Machine Learning Algorithm for B2C Portals; Published in: 2009 IEEE/WIC/ACM International Joint Conference on Web Intelligence and Intelligent Agent Technology Date of Conference: Sep. 18, 2009 (Year: 2009).

Massimiliano Barbi and Marco Bigelli, Crowdfunding practices in and outside the US, Jun. 2017, 47 pages, ResearchGate DOI: 10.1016/j.ribaf.2017.05.013 (Year: 2017).

Mattison, David, "Reality Check for your Muses: Creativity and Business Innovation Resources", Searcher; Medford Vol. 16, Iss. 10, (Nov.-Dec. 2008): 16-21, 55-59. (Year: 2008).

Miller, Nicole. "Inside Buffer's Community Delight Headquarters: How and Why We Send Swag and What It All Costs" Buffer, Apr. 27, 2015, 23 pages, https://buffer.com/resources/community-delight/ (Year: 2015).

Ondrejka, Cory, "Escaping the gilded cage: User created content and building the metaverse", 49 N.Y.L. Sch. L. Rev. 81 (2004). (Year: 2004) (23 pages).

Shipwire. "Marketing inserts" Shipwire support, Feb. 27, 2015, https://www.shipwire.com/w/support/marketing-inserts/ (Year: 2015) 9 pages.

Vanderhoef, II, Robert John, et. al., "An Industry of Indies: The New Cultural Economy of Digital Game Production", University of California, Santa Barbar, Sep. 2016, pages 1-259. (Year: 2016).

(56) References Cited

OTHER PUBLICATIONS

Wilson et al., Real World Applications of Machine Learning Techniques over Large Mobile Subscriber Datasets, SE4ML: Software Engineering for Machine Learning, 9 pages, ARXIV ID: 1502.02215 Publication Date: Feb. 8, 2015 (Year: 2015).

Yarbro, Printify Vs. Printful: Pros and Cons, Dec. 9, 2019, nomadicwander, https://nomadicwander.com/2019/12/09.printify-vs-printful-pros-and-cons/ (Year:2019) 10 pages.

Investing In Games With Fig Game Shares, Feb. 28, 2019, fig.co, 12 pages, https://www.fig.co/invest#rewards-based-crowdfunding (Year: 2019).

* cited by examiner

SYSTEMS AND METHODS TO RECOMMEND BENEFIT TYPES OF BENEFIT ITEMS TO OFFER WITHIN A MEMBERSHIP PLATFORM

FIELD

The disclosure relates to systems and methods to recommend benefit types of benefit items to offer within a membership platform.

BACKGROUND

Different platforms may be utilized by entities seeking contributions from the general public to obtain a needed service(s) and/or resource(s). Some of these platforms facilitate raising resources (i.e., funds) from the users through monetary contributions or donations to support a project. Oftentimes, supporters of a project are given rewards or special perks, where the size and/or exclusivity of the rewards or special perks may depend on the amount contributed.

SUMMARY

A membership platform may be comprised of users including one or more of content creators, subscribers, and/or other users. Content creators may be users of the membership platform who offer content (also referred to as "benefit items") to subscribers in exchange for consideration. A "benefit item" may refer to a good and/or service. A good may comprise a physical good and/or a digital good. In some implementations, subscribers may donate funds to a content creator such that the benefit item may be the altruism in supporting the content creator. Subscribers may be users of the membership platform who subscribe, through payment of a one-time and/or recurring (e.g., monthly) fee, to one or more content creators. A subscriber of an individual content creator may obtain access to benefit items offered through the membership platform by virtue of being a subscriber to the individual content creator. A subscriber of an individual content creator may obtain preferential access to benefit items offered through the membership platform by virtue of being a subscriber to the individual content creator. Preferential access may refer to subscriber-only access to benefit items and/or other content. Preferential access may refer to tiered levels of access to benefit items and/or other content. Different levels of access may offer different quantities, content types, and/or combinations of benefit items. Different levels may correspond to different amounts of consideration paid by the given subscriber. In some implementations, other users of the membership platform may obtain limited access to benefit items. In some implementations, other users may be non-paying users and/or one-time visitors to the membership platform.

Within a membership platform, content creators may not know which benefits to offer to acquire and retain subscribers. To help content creators know what to offer for their type of audience, benefits may classify into benefit types and content creators may be classified into creator types, so that determinations can be made with respect to what is being offered by different types of creators. Analysis of the impact of different benefit types on the subscribership may then be made. One or more implementations described herein may help solve some problems. For example, a creator may be about to launch their page, but may not know which benefit items to offer. A list of recommendations of benefit types of benefit items to offer may be generated. Further, a creator may have a page that is doing relatively good but not great (e.g., in terms of subscribership, monetization, and/or other metrics), and the content creator may not know how to improve. Still further, from the perspective of a subscriber, a content creator of interest may not be offering compelling benefit items, so the subscriber may not be inclined to subscribe and/or stick around for long. Still further, administrators of the membership platform may not know how to advise the content creators. Administrators on a business team of the membership platform may not be able to offer great analytics to fix all these problems. These and/or other problems may be solved through one or more implementations of the systems and methods described herein.

One aspect of the present disclosure relates to a system configured to recommend benefit types of benefit items to offer within a membership platform. The system may include one or more hardware processors configured by machine-readable instructions and/or other components. The machine-readable instructions may include one or more computer program components. The computer program components may include one or more of a creator profile component, benefit component, recommendation component, and/or other computer program components.

The creator profile component may be configured to obtain creator profile information for content creators of a membership platform, and/or other information. The creator profile information may include individual creator types of individual content creators. The individual creator types may correspond to classification of values of creator parameters. By way of non-limiting illustration, a first set of values of the creator parameters may classify the content creators as a first creator type. A second set of values of the creator parameters may classify the content creators as a second creator type. The creator parameters may characterize aspects of the content creators and/or content created by the content creators. The aspects of the content creators and/or content created by the content creators characterized by the creator parameters may include one or more of an intended audience, a typical medium of creation of the benefit items, a quantity of subscribers, and/or other aspects. By way of non-limiting illustration, the content creators may include one or more of a first content creator of the first creator type, a second content creator of the second creator type, and/or other content creators.

The benefit component may be configured to obtain benefit information for content creators of the membership platform, and/or other information. The benefit information may include descriptions of benefit items offered by the content creators to subscribers of the membership platform in exchange for consideration. The benefit items may be classified by different benefit types of the benefit items, and/or other characteristics. The benefit types may classify individual benefit items based on one or more of an amount of consideration requested to access the individual benefit items, a medium of creation of the individual benefit items, content of the individual benefit items, an amount of work or time investment to fulfill the individual benefit items, and/or other characteristics. By way of non-limiting illustration, the benefit information may describe one or more of a first benefit item offered by the first content creator, a second benefit item offered by a second content creator, and/or other benefit items. The first benefit item may be classified as a first benefit type. The second benefit item may be classified as a second benefit type.

The recommendation component may be configured to generate recommendations for the benefit types of the benefit items the content creators of a given creator type should offer. The recommendations may be generated based on one or more of creator profile information, benefit information, and/or other information. By way of non-limiting illustration, based on the content creators further including a third content creator of the first creator type, a first recommendation may be generated. The first recommendation may convey the third content creator should offer benefit items of the first benefit type.

The recommendation component may be configured to effectuate presentation of the recommendations on a user interface displayed on computing platforms of the content creators such that the first recommendation may be presented on the user interface displayed on a computing platform associated with the third content creator.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Some entities may seek to obtain funds through subscriptions. Such entities may utilize online membership plat-forms that allow consumers to sign up for ongoing payments in exchange for rewards or other membership benefits. Entities seeking funding may be content creators, for example, artists, musicians, educators, etc. Content creators may create content, which may refer to one or more of information, experience, products, and/or other content provided to an audience or end-user, whether it be digital, analog, virtual, and/or other form. For example, types of content may include but is not limited to video content, podcasts, photographic art, webcomics, do-it-yourself crafts, digital music, performance art, and/or other types of content. Content creators may utilize membership platforms that allow consumers to become subscribers of the content creator. As subscribers, consumers may contribute or donate money to a content creator on a recurring (e.g., weekly or monthly) basis and/or per piece of content created by the content creator. Content creators may interact with subscribers and/or prospective subscribers (e.g., consumers that show interest in the content created by content creators) in a variety of ways. Content creators may not know which benefit items to offer to attract and retain subscribers. To help content creators know what to offer for their type of audience, benefits may classify into benefit types and content creators may be classified into creator types, so that determinations can be made with respect to what is being offered by different types of creators.

Figure 1:
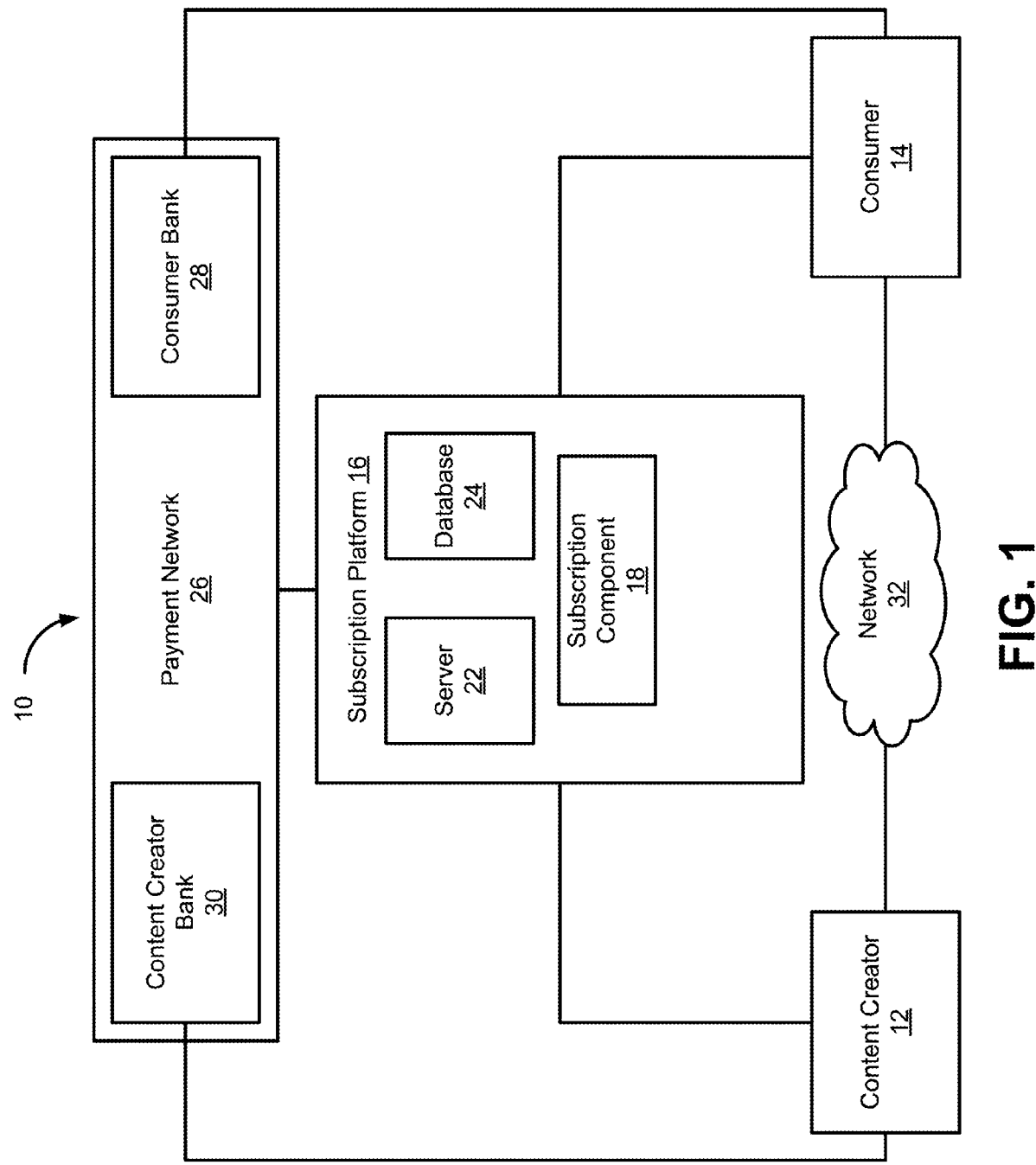
FIG. 1 illustrates an example membership system.

FIG. 1 illustrates an example subscriber-based membership system 10 (sometimes referred to herein as a "membership platform"). A content creator 12 may register and set up a creator account with subscription platform 16. Content creator 12 may create a page on a website hosted by server 22 of subscription platform 16 and input relevant information. Content creator 12 may input information associated with and/or relevant to content creator 12 via subscription component 18, such as creation information, content information, information specifying desired and/or initial subscription levels, preferred revenue source information (e.g., preferred currency, currency source, and/or other information), identification information (e.g., identification of applicable tax jurisdiction and/or other information), and/or other information. A page created by content creator 12 may be built using such information to make potential consumers aware of how content creator 12 may wish to be supported/receive support for his/her content creation in addition to subscribership revenue. Content creator 12 may set up a content creator account with subscription platform 16 through subscription component 18 or another appropriate component allowing content creator 12 to register with subscription platform 16. Various types of information regarding content creator 12 may be input into subscription platform 16, some of which may be information identifying content creator 12.

Consumer 14 (also referred to as a "subscriber") may set up a subscriber account with subscription platform 16. In setting up the subscriber account, consumer 14 may input demographic information relevant to consumer 14 (e.g., age, income, job, etc.). Information identifying consumer 14 (e.g., name, a picture, a phone number, etc.) may be input by consumer 14 when setting up the subscriber account. Through the page created by content creator 12, a consumer 14 may pledge to donate a given amount of money to content creator 12 every time content creator 12 creates content. For example, if content creator 12 is an artist, consumer 14 may pledge to donate ten dollars each time content creator 12 creates a piece of art.

In order to remit payment to content creator 12, consumer 14 may set up a payment mechanism through subscription platform 16 as part of setting up his/her subscriber account. When subscription platform 16 is notified or determines that content creator 12 has created content, subscription platform 16 may access payment network 26 to obtain and/or transfer the pledged amount from consumer bank 28 to content creator bank 30. Alternatively (or in addition to per content pledge donations), consumer 14 may pledge to donate a given amount to content creator 12 on a recurring basis through subscription platform 16. For example, consumer 14 may pledge to donate five dollars each month to content creator 12, where each month, subscription platform 16 may access payment network 26 to obtain and transfer the pledged amount from consumer bank 28 to content creator bank 30. It should be understood that consumer 14 may have an established relationship with consumer bank 28, and that content creator 12 may have an established relationship with content creator bank 30. It should be noted that subscription platform 16 may retain a portion, such as some percentage, of the pledged amount, as a fee for hosting the page created by content creator 12, providing payment services, etc.

As consideration for the pledged donations, content creator 12 may provide some type of preferential access to consumer 14 in the form of, e.g., special perks or rewards. Content creator 12 may specify tiers of preferential access based upon the amount of money consumer 14 pledges to donate and/or depending on whether the pledged donation is a recurring donation or a per content donation. The amounts and/or types of pledged donations that may be made by consumer 14 to back content creator 12 may be referred to as subscription levels.

For example, in return for a monthly, recurring dollar amount of donation, content creator 12 may provide a high-resolution digital image of the artwork created during that month to consumer 14. In exchange for a weekly, recurring dollar amount of donation, content creator 12 may provide a high-resolution digital image of the artwork created during that month as well as a time-lapse video of content creator 12 creating the artwork. In exchange for another dollar amount per content donation, content creator 12 may provide a low-resolution digital image of the artwork. For another dollar amount per content donation, content creator 12 may engage in a live webchat or live meet-and-greet with consumer 14. Various types of preferential access may be provided by content creator 12 to consumer 14, and content creator 12 may specify the subscription level to preferential access correlation.

The preferential access may be provided to consumer 14 from content creator 12. For example, content creator 12 may email digital copies of artwork to consumer 14 over a communications network, such as a local area network (LAN), a wide area network (WAN), a wireless network (e.g., WiFi), a mobile communication network, a satellite network, the Internet, fiber optic, coaxial cable, infrared, radio frequency (RF) or any other suitable network. The preferential access may be provided to consumer 14 from content creator 12 via subscriber platform 16. For example, the live webchat between content creator 12 and consumer 14 may be provided through some chat functionality of the page of content creator 12 hosted on server 22 of subscription platform 16, which may reside on communications network 32 or on another network (not shown).

It should be noted that not all subscription levels are necessarily associated with preferential access. Some consumers may be driven to subscribe to content creator 12 on the basis of created content rather than any special perks or rewards.

The specification and management of subscriptions on behalf of content creator 12 may be handled by subscription component 18 alone or in conjunction with database 24. For example, a user interface may be provided via subscription component 18 allowing content creator 12 to specify his/her desired subscription levels and corresponding preferential access, as well as his/her preferred sources of revenue. Subscription component 18 may receive the information input by content creator 12 and transmit the information for storage as one or more records, matrices, or other data structures in database 24 or within memory local to subscription component 18. Database 24 or the local memory of subscription component 18 may be configured in a suitable database configuration, such as a relational database, a structured query language (SQL) database, a distributed database, an object database, etc. Suitable configurations and database storage types will be apparent to persons having skill in the relevant art.

Content creator 12 may add subscribership information, update and/or delete existing subscribership information, add creation information, as well as update and/or delete creation information, add, update, and/or delete preferential access information and/or its correspondence to subscription levels, etc. Such changes may be input via subscription component 18 and reflected in its local memory and/or database 24. It should be understood that content creator 12 and/or consumer 14 may be an individual or some entity representative of an individual or group of individuals.

Apart from providing preferential access to consumer 14, content creator 12 may engage with consumer 14 by interacting in a variety of ways. For example, content creator 12 may communicate with consumer 14 over email, one or more social media platforms, a messaging platform or other appropriate communication mechanisms or methods. It should be understood that such communication platforms or mechanisms may be embodied in communications network 32 allowing content creator 12 and consumer 14 to communicate outside of subscription platform 16. It should be understood that communication platforms or mechanisms may operate in conjunction with subscription platform 16 such that one or more of their respective functionalities may be utilized through subscription platform 16. For example, social media hyperlinks allowing information from content creator 12's page may be provided on the webpage allowing content creator 12 to share content creation progress updates with consumer 14. For example, content creator 12 may respond to a communication from consumer 14 posted on a comment section provided on content creator 12's page in a private message or as part of the comment thread. It should be noted that content creator 12 may engage a single consumer, e.g., consumer 14, one-on-one and/or may engage a group of consumers. For example, content creator 12 may post a "public" comment on his/her webpage that may be seen by any consumer that is a subscriber to content creator 12 and/or any consumer that may be a potential subscriber.

Figure 2:
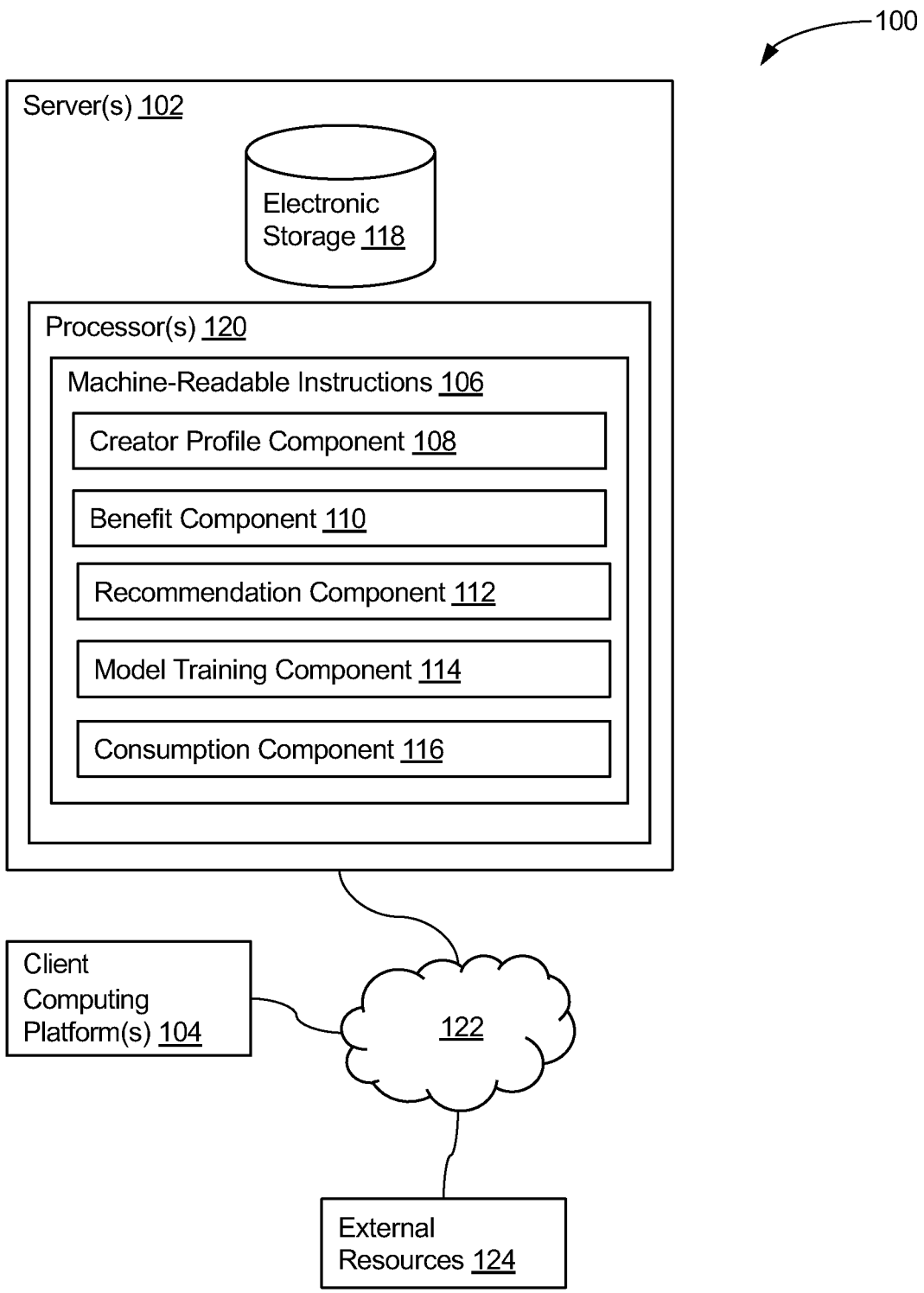
FIG. 2 illustrates a system configured to recommend benefit types of benefit items to offer within a membership platform, in accordance with one or more implementations.

FIG. 2 illustrates a system 100 configured to recommend benefit types of benefit items to offer within a membership platform. In some implementations, system 100 may include one or more of server(s) 102, client computing platform(s) 104, and/or other components. The terms client computing platform, remote computing platform, and/or computing platform may be used interchangeably herein to refer to individual ones of the client computing platform(s) 104. Server(s) 102 may be configured to communicate with one or more client computing platforms 104 according to a client/server architecture and/or other architectures via one or more network(s) 122. In some implementations, one or more network(s) 122 may include the Internet and/or other networks. Client computing platform(s) 104 may be configured to communicate with other client computing platforms via server(s) 102 and/or according to a peer-to-peer architecture, a client-server architecture, and/or other architectures. Users may access system 100 via client computing platform(s) 104.

It is noted the system 100 of FIG. 2 may be the same as, or included as part of, the system 10 shown in FIG. 1. For example, the server(s) 102 may be the same as or included in servers 22. Network(s) 122 may be the same as or included in network 32. Individual client computing platforms of one or more client computing platforms 104 may be computing platforms utilized by content creator 12 and/or consumer 14 to access system 10 and/or system 100. Non-transitory electronic storage 118 may be the same as or included in database 24. Accordingly, those skilled in the art will recognize that although system 10 and system 100 are shown and described separately, they may comprise a single common system. However, in some implementations, the features and/or functionality of system 100 may be provided remotely as a separate system from system 10.

Server(s) 102 may be configured by machine-readable instructions 106. Machine-readable instructions 106 may include one or more computer program components. The computer program components may include one or more of a creator profile component 108, benefit component 110, a recommendation component 112, a model training component 114, a consumption component 116, and/or other computer program components.

Creator profile component 108 may be configured to obtain creator profile information for content creators of a membership platform, and/or other information. The creator profile information may include individual creator types of individual content creators. The individual creator types may correspond to classification of values of creator parameters. The creator parameters may characterize aspects of the content creators and/or content created by the content creators. In some implementations, a set of values which classify content creators as a given creator type may be entirely separate and distinct from other sets of values which classify the content creators as other creator types. In some implementations, a set of values which classify content creators as a given creator type may include at least one value that is not included in other sets of values which classify the content creators as other creator types.

In some implementations, the aspects of the content creators and/or content created by the content creators characterized by the creator parameters may include one or more of an intended audience, a typical medium of creation of the benefit items, a quantity of subscribers, and/or other aspects. Accordingly, the creator parameters may include one or more of an audience parameter, a medium of creation parameter, a subscribership parameter, and/or other parameters.

A value of the audience parameter may specify the intended audience of a content creator. The value of the audience parameter may be specified by the content creator during registration of a user account with the membership platform and/or determined based on the demographics of subscribers to the content creator. In some implementations, the intended audience may be defined with respect to one or more demographics. The one or more demographics may include one or more of sex, age, age range, personal preferences (e.g., religious, political, types of content, hobbies, and/or other subscriber specified preferences), physical location, and/or other demographics.

A value of the medium of creation parameter may specify the typical medium of creation of the benefit items. Medium of creation may refer to one or more of the materials that used to create content, the nature of the creation (e.g., physical vs digital), and/or other considerations. In some implementations, the typical medium of creation of the benefit items may be self-identified by the content creator. By way of non-limiting illustration, the value of the medium of creation parameter may be specified by the content creator during registration of a user account with the membership platform. By way of non-limiting illustration, for example, for a content creator who indicates that they create podcasts, the typical medium of creation may be "audio recordings". In some implementations, the typical medium of creation of the benefit items may be the most common medium for the creator of benefit items. Commonality may refer to a majority, e.g., over 50% of the content created. By way of non-limiting illustration, a content creator may create webcomics, post regular blog posts, sell T-shirts, and/or produce other content. It may be determined that the majority of the benefit items created are webcomics. This may mean that the typical medium of creation of the benefit items may be "web-based graphic art."

A value of a subscribership parameter may specify a quantity of subscribers to an individual content creator. In some implementations, a value of a subscribership parameter may specify a mean, median, and/or mode of the quantity of subscribers for the individual content creator. In some implementations, a value of a subscribership parameter may specify a highest quantity of subscribers the content creator has achieved. In some implementations, a value of a subscribership parameter may specify a lowest quantity of subscribers the content creator has had. In some implementations, a value of a subscribership parameter may specify a frequency at which the content creator gains and/or loses subscribers.

By way of non-limiting example, the content creators may include one or more of a first content creator of a first creator type, a second content creator of a second creator type, and/or other content creators. In some implementations, a first set of values of the creator parameters may classify the content creators as the first creator type. In some implementations, a second set of values of the creator parameters classifies the content creators as the second creator type. In some implementations, the first set of values may be entirely separate and distinct from the second set (e.g., there are no shared values). In some implementations, the first set of values may have at least one value that is not included in the second set.

Benefit component 110 may be configured to obtain benefit information for content creators of a membership platform and/or other information. The benefit information may include descriptions of benefit items offered by the content creators to subscribers of the membership platform in exchange for consideration, and/or other information. The benefit items may be classified by different benefit types of the benefit items, and/or other characteristics. The benefit types may classify the individual benefit items based on one or more aspects of the benefit items. The one or more aspects may include one or more of an amount of consideration requested to access the benefit items (e.g., the subscription level needed to obtain access to a given benefit item), a medium of creation of the individual benefit items, content of the individual benefit items, an amount of work or time investment to fulfill the individual benefit items, and/or other characteristics. The content of the individual benefit items may include one or more of a painting, a song, music, spoken word audio (e.g., a podcast, a shout out, and/or other audio), a video content, photographic art, webcomics, do-it-yourself crafts, performance art, and/or other content. The amount of work or time investment to fulfill (e.g., create and/or distribute) the individual benefit items may refer to one or more of a quantitative description of work or time investment (e.g., a quantity of units of time to fulfill an individual benefit item such as minutes, hours, days, weeks, month, etc.), a qualitative description of work or time investment (e.g., easy, medium, hard, extra hard, etc.), and/or other measures. In some implementations, benefit information may be obtained from individual content creators through entry and/or selection of the benefit information by the individual content creators into a user interface. In some implementations, the user interface may be displayed during a registration of user accounts of the content creators with the membership platform.

By way of non-limiting example, the benefit information may describe one or more of a first benefit item offered by the first content creator, a second benefit item offered by a second content creator, and/or other benefit items. The first benefit item may be classified as a first benefit type and/or other characteristics. The second benefit item may be classified as a second benefit type and/or other characteristics. Other benefit items may be described which may yet to be classified by benefit type.

In some implementations, recommendation component 112 may be configured to determine associations between individual creator types and individual benefit types. In some implementations, an association between a given creator type and a given benefit type may be made when a quantity of content creators of the given creator type who create benefit items of the given benefit type meets and/or exceeds a threshold. The threshold may be a value (e.g., 100 content creators and/or other values), a percentage (e.g., more than 50% of the content creators of the given creator type within the membership platform and/or other percentages), and/or other measures. By way of non-limiting example, an association may be determined between the first creator type and the first benefit type. Further, an association may be determined between the second creator type and the second benefit type.

Recommendation component 112 may be configured to generate recommendations for the benefit types of the benefit items the content creators of a given creator type should offer. Such recommendations may be based on one or more of the creator profile information, the benefit information, associations between creator types and benefit types and/or other information. By way of non-limiting example, based on the content creators further including a third content creator of the first creator type, a first recommendation may be generated for the third content creator to offer the benefit items of the first benefit type.

In some implementations, recommendation component 112 may be configured to generate recommendations for changing the benefit types of the benefit items offered by the content creators of the given creator type. Such recommendations may be based on one or more of the creator profile information, the benefit information, associations between creator types and benefit types, and/or other information. By way of non-limiting example, based on the content creators further including a fourth content creator of the first creator type offering a third benefit item of the second benefit type, a second recommendation may be generated for the fourth content creator to change the offer of the third benefit item of the second benefit type to the benefit items of the first benefit type. Such recommendations may be beneficial for content creators who have already established accounts with the membership platform and may be struggling with subscribership, revenue, and/or other issues.

In some implementations, recommendation component 112 may be configured to effectuate presentation of recommendations on a user interface displayed on the computing platform(s) 104 associated with content creators during registration of user accounts with the membership platform. By way of non-limiting example, recommendation component 112 may be configured to effectuate presentation of the first recommendation on a user interface displayed on a computing platform associated with the third content creator during registration of a user account of the third content creator within the membership platform.

In some implementations, consumption component 116 may be configured to obtain consumption information and/or other information. The consumption information may describe acceptance of offers for the benefit items by the subscribers. The acceptance of the offers for the benefit items by the subscribers may be described based on one or more of quantity of subscribers who have accepted the offers (e.g., including one or more of a total, an average, a frequency, a quantity over a certain time period, etc.), an amount of revenue received from subscribers who have accepted the offers (e.g., including one or more of a total, an average, a frequency, a quantity over a certain time period, etc.), and/or other information. The benefit types of the benefit items corresponding to the greater acceptance may include the benefit types of the benefit items having been accepted by a threshold quantity of the subscribers and/or other factors.

The recommendation component 112 may be configured to determine recommendations based on the consumption information and/or other information. The recommendations may include the benefit types of the benefit items offered by content creators of a given creator type that correspond to greater acceptance. The condition of "greater" may be relative to one or more of other benefit items offered by other content creators (e.g., a system-wide basis), other benefit items offered by individual content creators (e.g., a content creator basis), and/or other information.

In some implementations, model training component 114 may be configured to train a machine learning model to identify the benefit types of the benefit items from the descriptions of the benefit items. The benefit information may describe the benefit items in an unstructured data format. An unstructured data format may refer to a text-based description proffered by the content creators. The text-based description may be generated by the content creators in their own words, which may comprise jargon and/or a lexicon specific to the content creator.

The model training component 114 may be configured to train the machine learning model based on a training corpus and/or other information to generate a trained machine learning model. The training corpus may include input/output pairs. The individual input/output pairs may include one or more of training input information, training output information, and/or other information. The training input information may include the descriptions of the benefit items and/or other information. The training output information may include the benefit types of the benefit items and/or other information. Model training component 114 may be configured to store the trained machine learning model.

The machine learning model may include one or more of a neural network, a convolutional neural network, and/or other machine-learning framework. In some implementations, the machine learning model may be configured to optimize objective functions. In some implementations, optimizing objective functions may include one or both of maximizing a likelihood of the training set or minimizing a classification error on a held-out set.

In some implementations, recommendation component 112 may be configured to determine, using the trained machine learning model, the benefit types of the benefit items yet to be characterized by the benefit types.

In some implementations, recommendation component 112 may be configured to effectuate presentation of recommendations on a user interface displayed on computing platform(s) 104 associated with the content creators. The user interface may be configured to obtain user entry and/or selection by the content creators to accept the recommendations. In some implementations, the user interface may be part of the membership platform. In some implementations, the user interface may be provided through one or more communication channels external to the membership platform, e.g., email, SMS, etc. In some implementations, acceptance of recommendations may cause individual pages for the individual content creators to be automatically configured specifically for the provision and/or distribution of benefit items of the recommended benefit types. This may include introducing features and/or functionality that may be required for benefit items of a certain benefit type to be provided by the content creator and/or distributed to the subscribers. By way of non-limiting illustration, digital benefit items may need to be uploaded by the content creators via a file upload application and/or downloaded via a file download application which may be introduced to the content creators page after accepting a recommendation. Physical benefit items may require the collection of delivery addresses of the subscribers. Accordingly, a page may be specifically reconfigured to facilitate receiving such information from subscribers through one or more user interface elements (e.g., a text input field may be required). By way of non-limiting illustration, a recommendation to offer blog posts may cause the page of the content creator to display, configure, and/or otherwise provide for a blog posting functionality. By way of non-limiting illustration, a recommendation to offer web-based graphic art may cause the page of the content creator to display, configure, and/or otherwise provide the functionality to upload the graphic art, post a link to a website, provide download capabilities to subscribers, and/or other functionality.

An instance of a user interface may include one or more user interface elements configured to facilitate user interaction with the user interface. By way of non-limiting illustration, user interface elements may include one or more of text input fields, drop down menus, check boxes, display windows, virtual buttons, and/or other elements configured to facilitate user interaction. In some implementations, recommendations may be provided through one or more of a drop down menu showing a list of the recommended benefit types and/or by other presentation techniques. Acceptance of the recommendation may be based on selection of one or more recommended benefit types from the list in the drop down menu.

By way of non-limiting illustration, recommendation component 112 may be configured to effectuate presentation of the first recommendation on a user interface displayed on a computing platform associated with the third content creator. The user interface may be configured to obtain user entry and/or selection by the third content creator to accept the first recommendation.

In some implementations, recommendation component 112 may be configured to effectuate presentation of one or more recommendations for benefit types of benefit items to offer on a user interface displayed on the computing platform(s) 104 associated with content creators during registration of user accounts within the membership platform. The user interface may be configured to obtain one or more of user entry and/or selection to accept recommendations, and/or other input.

Figure 5:
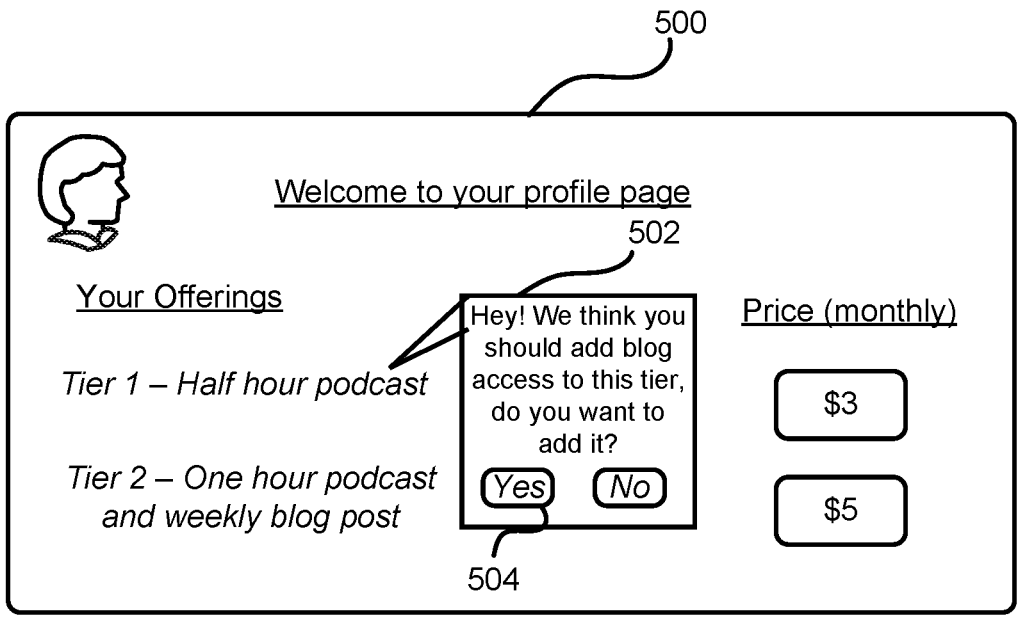
FIG. 5 illustrates a user interface, in accordance with one or more implementations.

FIG. 5 illustrates a user interface 500 displayed to a content creator, in accordance with one or more implementations. The user interface 500 may display a recommendation 502 conveying a benefit type of the benefit items the content creator of a given creator type should offer. In some implementations, the user interface 500 may be associated with a content creator who has established an account and/or is already providing offers for content to subscribers. By way of non-limiting illustration, the user interface 500 may represent a content creator profile overview. The user interface 500 may be configured to obtain user entry and/or selection by the content creator to accept the recommendation 502. By way of non-limiting illustration, a user interface element 504 may be provided. For illustrative purposes, the recommendation 502 may be to offer a given benefit type of benefit item (text-based digital content, e.g., a blog) within a certain level of access (e.g., "tier 1"). Acceptance of the recommendation 502 may cause a page (not shown) of the content creator to display, configure, and/or otherwise provide for a blog posting functionality for subscribers who have access to that level.

Figure 6:
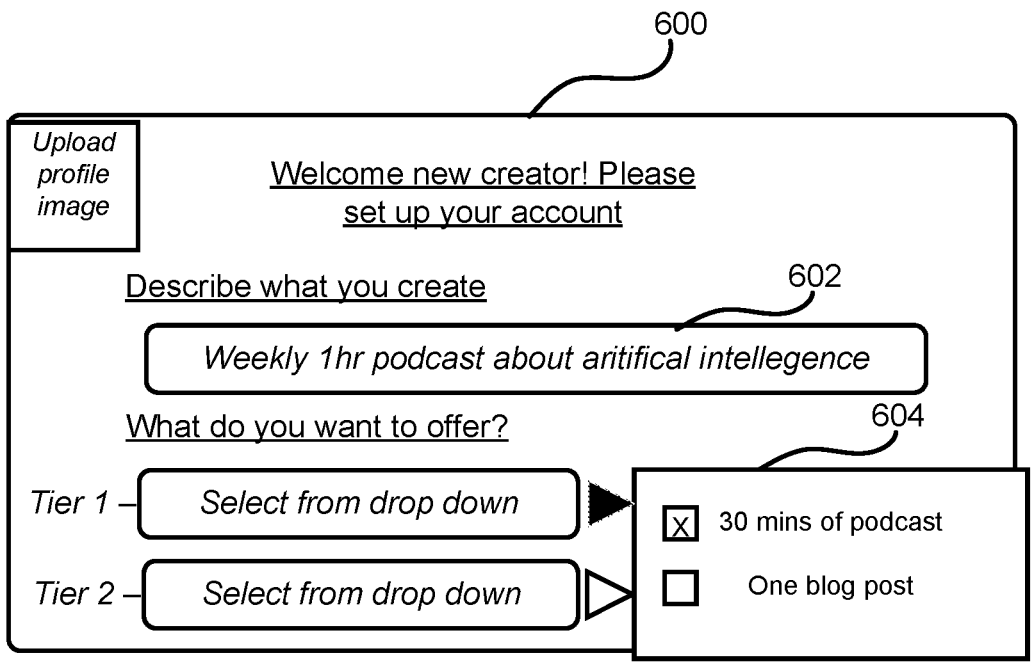
FIG. 6. illustrates a user interface, in accordance with one or more implementations.

FIG. 6. illustrates a user interface 600, in accordance with one or more implementations. The user interface 600 may be displayed during a registration of a user account of the content creator with the membership platform. The user interface 600 may include a user interface element 602 configured to obtain entry and/or selection of creator profile information and/or other information. The user interface 600 may include a recommendation 604 to offer one or more benefit items of one or more benefit types. The recommendation 604 may include a list of recommended benefit types of the benefit items to offer. The user interface 600 may be configured to obtain entry and/or selection by the content creator to accept one or more of the items in the list. By way of non-limiting illustration, recommendation 604 may be comprised of a list of check boxes which may be selected to accept one or more of the recommended benefit types. Acceptance of the recommendation 604 may cause a page (not shown) of the content creator to display, configure, and/or otherwise provide for functionality for subscribers associated with the accepted ones of the recommended benefit types.

Returning to FIG. 2, server(s) 102, client computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute one or more computer program components. The computer program components may be configured to enable an expert or user associated with the given client computing platform 104 to interface with system 100, system 10, and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 118, one or more processors 120, and/or other components. Server(s) 102 may include communication lines, or ports to enable the exchange of information with a network and/or other computing platforms. Illustration of server(s) 102 in FIG. 2 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one or both of system storage that is provided integrally (i.e., substantially non-removable) with server(s) 102 and/or removable storage that is removably communicable with server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platform(s) 104, and/or other information that enables server(s) 102 to function as described herein.

Processor(s) 120 may be configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 2 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute components 108, 110, 112, 114, and/or 116, and/or other components. Processor(s) 120 may be configured to execute components 108, 110, 112, 114, and/or 116, and/or other components by software; hardware; firmware; some combination of software, hardware, and/or firmware; and/or other mechanisms for configuring processing capabilities on processor(s) 120. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 2 as being implemented within a single processing unit, in implementations in which processor(s) 120 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 120 may be configured to execute one or more additional components that may perform some or all of the functionality attributed below to one of components 108, 110, 112, 114, and/or 116.

Figure 3:
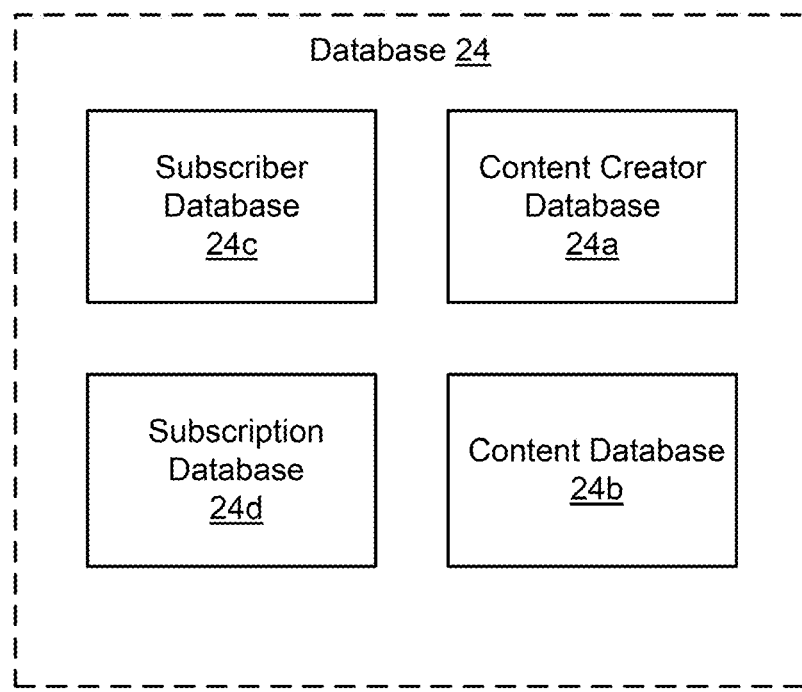
FIG. 3 illustrates an example database.

FIG. 3 illustrates elements that may make up database 24. As indicated previously, subscription component 18 of FIG. 1 may transmit information input by content creator 12 and/or consumer 14 regarding creation and/or subscribership information to database 24. Subscription platform 16, via server 22, for example, may monitor and obtain creation and/or subscribership information for storage in database 24. For example, subscription platform 16 may monitor and store additional content creator and/or subscriber demographic information as well as performance-related subscribership information, e.g., engagement activity between content creator 12 and his/her subscribers, one of whom may be consumer 14. For example, subscription platform 16 may monitor the amount of money being generated and/or lost through the subscribers (e.g., outcome information), as well as content creator 12's subscriber retention rate. For example, subscription platform 16 may monitor and store performance-related creation information, such as the amount of content that content creator 12 is creating, how often and/or how quickly content creator 12 reacts to subscriber engagement activity, etc.

Database 24 may include one or more databases or partitions in which information relating to content creator 12, and/or subscribership relevant to content creator 12. For example, database 24 may include a content creator database 24a, a content database 24b, a subscriber database 24c, and a subscription database 24d. It should be noted that the elements and/or functionality of database 24 may be implemented in local memory resident in subscription component 18 or shared between database 24 and the local memory of subscription component 18 rather than solely in database 24.

Database 24 may be populated with one or more of benefit information, consumption information, recommendations, associations between benefit types and creator types, creation data and/or subscription level information monitored or obtained from and/or associated with existing content creator and/or subscriber accounts established in subscription platform 16, and/or other information. Creation data may refer to creator profile information that characterizes one or more of content creator 12, the content that content creator 12 creates, and activity engaged in by content creator 12 to interact with one or more subscribers and/or to which consumer 14 is granted preferential access.

Creator profile information characterizing content creator 12 may be information reflecting the creator type that content creator 12 designates him/herself to be and/or other self-identified preferences regarding subscription offerings by content creator 12. For example, content creator type information may reflect that content creator 12 may be a paint artist, a digital artist, a sculptor, a video game developer, a writer, a performance artist, etc. Content creator preference information may reflect subscription levels content creator 12 wishes to offer to subscribers. Content creator preference information may reflect, e.g., a desired minimum revenue, preferred sources of revenue, subscription level proportions, etc. For example, content creator preference information may include information indicating content creator 12's desire for more subscribers pledging some amount of money or less subscribers pledging a greater amount of money. For example, content creator preference information may include information specifying that content creator 12 wishes to supplement his/her subscription-generated revenue with revenue generated from the sale of promotional merchandise. Such information may be stored in a content creator database 24a.

In addition to content creation-related information, and upon registering with subscription platform 16 as a content creator, content creator 12 may input information characterizing the identity of content creator 12. For example, content creator 12 may input or upload contact information, a telephone number associated with a personal user device, such as smartphone, an email address, a photograph, and/or other identifying information. Such identifying information may be used by subscription platform 16 in a variety of ways to associate content creator 12 with particular content, his/her webpage, payment of subscription donations, and/or other information.

Creator profile information characterizing the content that content creator 12 creates may refer to one or more of the benefit type of content created, the medium in which the content is created and/or presented (based on self-identified preference, commonality, and/or other measure), the amount of content created, the frequency at which the content is created, and/or other information. For example, benefit type of content information and/or content medium information may indicate that content creator 12 prefers to create paintings on canvas, develops video games for a mobile platform, performs in online musical performances, and/or other information. For example, the amount of content information may reflect that content creator 12 created a series of artwork comprising four paintings. For example, content frequency information may indicate that content creator 12 developed three video games over the course of six months. Such information may be stored in content database 24b.

Consumer 14 may subscribe to content creator 12 by registering with subscription platform 16. During registration, consumer 14 may input certain subscriber demographic information indicative of economic and/or social characteristics of consumer 14. Subscriber demographic information may reflect the yearly income of consumer 14, a geographic area in which consumer 14 resides, the age of consumer 14, interests of consumer 14, etc. Subscriber information may include data regarding the amount of money consumer 14 is currently pledged to donate to one or more content creators. Over time, as monitored and collected by subscription platform 16, subscriber information may include information regarding the amount of money consumer 14 has previously donated to one or more content creators, including content creator 12. Subscriber information, as monitored and obtained by subscription platform 16 may include an Internet Protocol (IP) address indicative of a current location of consumer 14 and/or an IP address indicating a payment source. Such information may be stored in subscriber database 24c.

Like content creator 12, consumer 14 may input or upload other identifying information that may be used by subscription platform 16 in a variety of ways to associate consumer 14 with particular content, a particular content creator, payment of subscription donations, etc. For example, a photograph or phone number of consumer 14 may be used, e.g., as a mechanism for correlating consumer 14's attendance at a live event with consumer 14's status as a subscriber of content creator 12, another content creator present at the live event, a subscriber of content similar to that being presented at the live event, etc. Such information may be stored in subscriber database 24c. Subscription component 18 or another component may be used to provide a user interface that may be used by consumer 14 to input such information.

Subscription level information may refer to information characterizing different subscription levels and corresponding preferential access information specified by content creator 12. For example, subscription level information may reflect that a ten dollar recurring donation is rewarded with a high-resolution digital image of artwork created during that month to consumer 14. Such subscriber level information may be stored in subscription database 24d.

It should be noted that other databases or partitions may make up database 24. For example, database 24 may include one or more databases or partitions for storing information including, but not limited to the following: preferential access information characterizing activity in which content creator 12 engagements may refer to data reflecting the type of activity, the level and/or exclusivity of preferential access to that activity granted to consumer 14; subscriber and/or content creator engagement information characterizing interactions, the type and/or frequency of interactions between subscribers and content creators, and/or the medium over which interactions may occur; and historical subscription level and/or engagement information reflecting subscription level and/or engagement information monitored and gathered over one or more periods of time.

It should be noted that some of the information described above may not necessarily be required. It should be noted that information reflecting additional aspects of, e.g., the content, content creator, content creator preferences, and/or subscribership, is contemplated by the disclosure. For example, preferential access need not necessarily be offered for each subscription level. For example, subscriber data may include data reflecting particular content creators to which a subscriber pledges donations.

Figure 4:
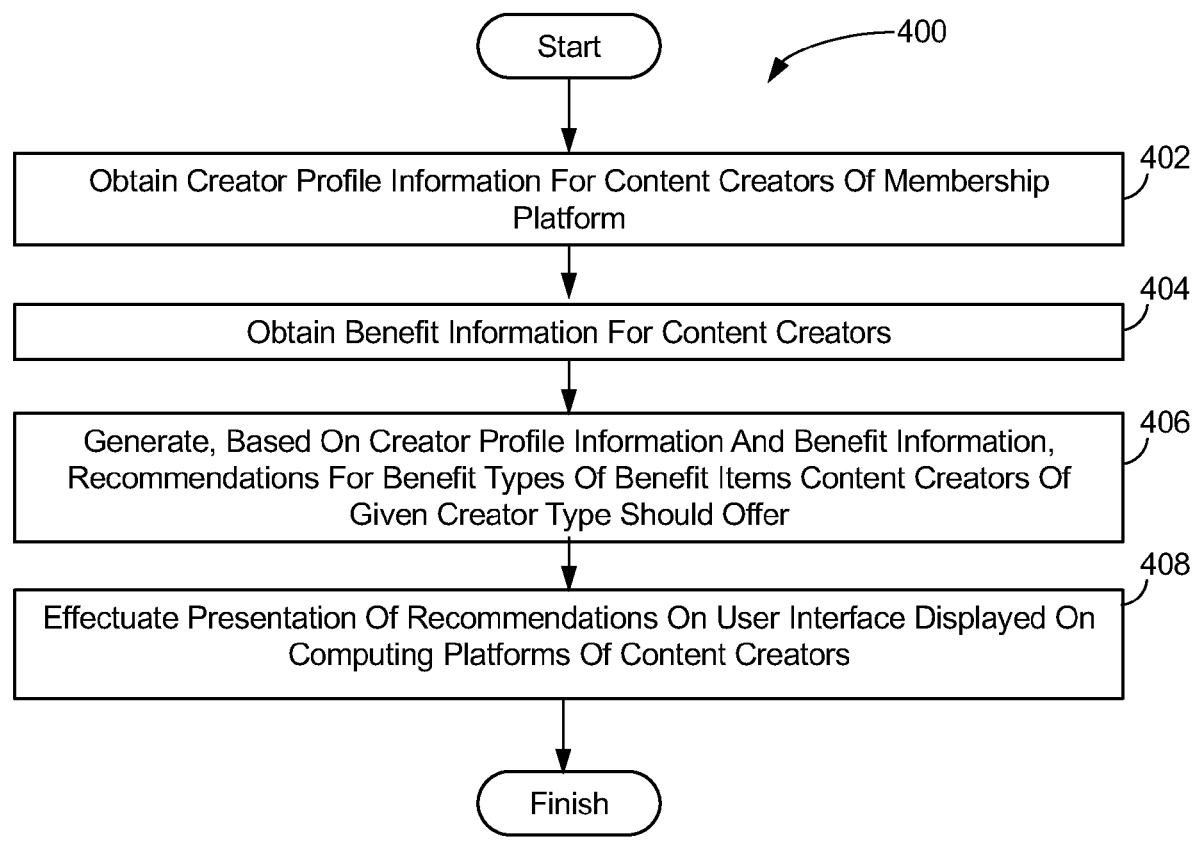
FIG. 4 illustrates a method to recommend benefit types of benefit items to offer within a membership platform, in accordance with one or more implementations.

FIG. 4 illustrates a method 400 to recommend benefit types of benefit items to offer within a membership platform, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include obtaining creator profile information for content creators of a membership platform and/or other information. Operation 402 may be performed by one or more hardware processors configured by machine-readable instructions including a component that is the same as or similar to creator profile component 108, in accordance with one or more implementations.

An operation 404 may include obtaining benefit information for content creators and/or other information. The benefit information may include descriptions of benefit items offered by the content creators to subscribers of the membership platform in exchange for consideration, the benefit items being characterized by benefit types. Operation 404 may be performed by one or more hardware processors configured by machine-readable instructions including a component that is the same as or similar to benefit component 110, in accordance with one or more implementations.

An operation 406 may include generating, based on the creator profile information, the benefit information, and/or other information, recommendations for the benefit types of the benefit items the content creators of a given creator type should offer. Operation 406 may be performed by one or more hardware processors configured by machine-readable instructions including a component that is the same as or similar to recommendation component 112, in accordance with one or more implementations.

An operation 408 may include effectuating presentation of the recommendations on a user interface displayed on computing platforms of the content creators. Operation 408 may be performed by one or more hardware processors configured by machine-readable instructions including a component that is the same as or similar to recommendation component 112, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to recommend benefit types of benefit items to offer within a membership platform, the system comprising:
    one or more physical processors configured by machine-readable instructions to:
        manage, by one or more servers, an online membership platform, the online membership platform being configured to host content creators, the content creators offering subscribership to potential subscribers in exchange for requested amounts of recurring consideration, wherein subscribers receive recurring benefit items through the online membership platform from the content creators as part of the subscribership;
        obtain, by the one or more servers, creator profile information for the content creators of the online membership platform, the creator profile information including individual creator types of individual content creators, the individual creator types corresponding to classification of values of creator parameters, the creator parameters characterizing aspects of the content creators and/or content created by the content creators, the content creators including a first set of content creators of a first creator type and a second set of content creators of a second creator type;
        obtain, by the one or more servers, benefit information for the content creators, the benefit information including descriptions of the benefit items received by the subscribers to the content creators in accordance with the subscribership offered by the content creators within the online membership platform, the benefit items being classified by benefit types, such that the benefit information describes a first set of benefit items received in accordance with the subscribership offered by the first set of content creators, and a second set of benefit items offered by the second set of content creators, the first set of benefit items being classified as a first benefit type, and the second set of benefit items being classified as a second benefit type;
        generate, by the one or more servers and based on the creator profile information and the benefit information, recommendations for the benefit types of the benefit items the content creators of a given creator type should provide to the subscribers as part of the subscribership, such that based on the content creators further including a first content creator of the first creator type, generate a first recommendation for the first content creator to provide the benefit items of the first benefit type to their subscribers in accordance with a first subscribership offered by the first content creator;
        effectuate communication of recommendation information from the one or more servers to computing platforms associated with the content creators to cause the computing platforms to present the recommendations on a user interface of the online membership platform, such that the first recommendation is presented on the user interface displayed on a computing platform associated with the first content creator; and
        responsive to acceptance of the recommendations through the user interface, automatically configure, by the one or more servers, creator pages for the content creators to provide and/or distribute the benefit items of the benefit types recommended in the recommendations, such that responsive to acceptance of the first recommendation by the first content creator, automatically configure a first creator page for the first content creator to provide and/or distribute the benefit items of the first benefit type.

2. The system of claim 1, wherein the aspects of the content creators and/or content created by the content creators characterized by the creator parameters include one or more of an intended audience, a typical medium of creation of the benefit items, or a quantity of subscribers.

3. The system of claim 1, wherein the benefit types classify individual benefit items based on one or more of an amount of consideration requested to access the individual benefit items, a medium of creation the individual benefit items, an amount of work or time investment, or content of the individual benefit items.

4. The system of claim 1, wherein the one or more physical processors are further configured by the machine-readable instructions to:
determine associations between the individual creator types and individual benefit types, including determining an association between the first creator type and the first benefit type, and an association between the second creator type and the second benefit type.

5. The system of claim 1, wherein the one or more physical processors are further configured by the machine-readable instructions to:
generate, based on the creator profile information and the benefit information, recommendations for changing the benefit types of the benefit items offered by the content creators of the given creator type, such that based on the content creators further including a second content creator of the first creator type providing a first benefit item of the second benefit type as part of the subscribership to the second content creator, generate a second recommendation for the second content creator to change the first benefit item of the second benefit type to one or more of the benefit items of the first benefit type.

6. The system of claim 1, wherein the one or more physical processors are further configured by the machine-readable instructions to:
obtain consumption information, the consumption information describing acceptance of offers for the subscribership by the subscribers; and
determine the benefit types of the benefit items corresponding to greater acceptance.

7. The system of claim 6, wherein the acceptance of the offers is described based on quantity of the subscribers who have accepted the offers, and wherein the benefit types of the benefit items corresponding to the greater acceptance include the benefit types of the benefit items that are included as part the subscribership that have been accepted by a threshold quantity of the subscribers.

8. The system of claim 1, wherein the first recommendation is presented on the user interface displayed during a registration of a user account of the first content creator with the online membership platform.

9. The system of claim 1, wherein a first set of values of the creator parameters classifies the content creators as the first creator type, and a second set of values of the creator parameters classifies the content creators as the second creator type.

10. A method to recommend benefit types of benefit items to offer within a membership platform, the method comprising:
managing, by one or more servers, an online membership platform, the online membership platform being configured to host content creators, the content creators offering subscribership to potential subscribers in exchange for requested amounts of recurring consideration, wherein subscribers receive recurring benefit items through the online membership platform from the content creators as part of the subscribership;
obtaining, by the one or more servers, creator profile information for the content creators of the online membership platform, the creator profile information including individual creator types of individual content creators, the individual creator types corresponding to classification of values of creator parameters, the creator parameters characterizing aspects of the content creators and/or content created by the content creators, the content creators including a first set of content creators of a first creator type and a second set of content creators of a second creator type;
obtaining, by the one or more servers, benefit information for the content creators, the benefit information including descriptions of the benefit items received by the subscribers to the content creators in accordance with the subscribership offered by the content creators within the online membership platform, the benefit items being classified by benefit types, such that the benefit information describes a first set of benefit items offered by the first content creators, and a second set of benefit items offered by a second content creators, the first set of benefit items being classified as a first benefit type, and the second set of benefit items being classified as a second benefit type;
generating, by the one or more servers and based on the creator profile information and the benefit information, recommendations for the benefit types of the benefit items the content creators of a given creator type should provide to the subscribers as part of the subscribership, such that based on the content creators further including a first content creator of the first creator type, generate a first recommendation for the first content creator to provide the benefit items of the first benefit type to their subscribers in accordance with a first subscribership offered by the first content creator;
effectuating communication of recommendation information from the one or more servers to computing platforms associated with the content creators to cause the computing platforms to present the recommendations on a user interface of the online membership platform, such that the first recommendation is presented on the user interface displayed on a computing platform associated with the first content creator; and
responsive to acceptance of the recommendations through the user interface, automatically configuring, by the one or more servers, creator pages for the content creators to provide and/or distribute the benefit items of the benefit types recommended in the recommendations, including responsive to acceptance of the first recommendation by the first content creator, automatically configuring a first creator page for the first content creator to provide and/or distribute the benefit items of the first benefit type.

11. The method of claim 10, wherein the aspects of the content creators and/or content created by the content creators characterized by the creator parameters include one or more of an intended audience, a typical medium of creation of the benefit items, or a quantity of subscribers.

12. The method of claim 10, wherein the benefit types classify individual benefit items based on one or more of an amount of consideration requested to access the individual benefit items, a medium of creation the individual benefit items, an amount of work or time investment, or content of the individual benefit items.

13. The method of claim 10, further comprising:
determining associations between the individual creator types and individual benefit types, including determining an association between the first creator type and the first benefit type, and an association between the second creator type and the second benefit type.

14. The method of claim 10, further comprising :
generating, based on the creator profile information and the benefit information, recommendations for changing the benefit types of the benefit items offered by the content creators of the given creator type, including based on the content creators further including a second content creator of the first creator type providing a first benefit item of the second benefit type as part of the subscribership to the second content creator, generating a second recommendation for the second content creator to change the first benefit item of the second benefit type to one or more of the benefit items of the first benefit type.

15. The method of claim 10, further comprising:
obtaining consumption information, the consumption information describing acceptance of offers for the subscribership by the subscribers; and
determining the benefit types of the benefit items corresponding to greater acceptance.

16. The method of claim 15, wherein the acceptance of the offers is described based on quantity of the subscribers who have accepted the offers, and wherein the benefit types of the benefit items corresponding to the greater acceptance include the benefit types of the benefit items that are included as part the subscribership that have been accepted by a threshold quantity of the subscribers.

17. The method of claim 10, wherein the first recommendation is presented on the user interface displayed during a registration of a user account of the firstcontent creator with the online membership platform.

18. The method of claim 10, wherein a first set of values of the creator parameters classifies the content creators as the first creator type, and a second set of values of the creator parameters classifies the content creators as the second creator type.

19. The method of claim 10, further comprising:

training a machine learning model to identify the benefit types of the benefit items from the descriptions of the benefit items, the machine learning model being trained on input/output pairs to generate a trained machine learning model, the individual input/output pairs including training input information and training output information, the training input information including the descriptions of the benefit items, and the training output information including the benefit types of the benefit items;

store the trained machine learning model; and determine, using the trained machine learning model, the benefit types of the benefit items yet to be classified by the benefit types.

* * * * *

UNITED STATES PATENT AND TRADEMARK OFFICE
CERTIFICATE OF CORRECTION

PATENT NO. : 11,790,391 B1
APPLICATION NO. : 16/821393
DATED : October 17, 2023
INVENTOR(S) : Darby Thomas et al.

It is certified that error appears in the above-identified patent and that said Letters Patent is hereby corrected as shown below:

In the Claims

In Claim 17, Column 21, Line 22 please delete "firstcontent" and insert --first content--, therefor.

Signed and Sealed this
Fifth Day of December, 2023

Katherine Kelly Vidal
*Director of the United States Patent and Trademark Office*